United States Patent [19]

Creed et al.

[11] Patent Number: 4,930,455
[45] Date of Patent: Jun. 5, 1990

[54] CONTROLLING ENGINE COOLANT FLOW AND VALVE ASSEMBLY THEREFOR

[75] Inventors: Brian T. Creed; Cyril E. Bradshaw, both of Wheaton, Ill.

[73] Assignee: Eaton Corporation, Cleveland, Ohio

[21] Appl. No.: 258,098

[22] Filed: Oct. 14, 1988

Related U.S. Application Data

[63] Continuation of Ser. No. 882,665, Jul. 7, 1986, abandoned.

[51] Int. Cl.$^5$ .............................................. F01P 7/14
[52] U.S. Cl. ................................ 123/41.1; 123/41.02; 251/129.11
[58] Field of Search ............... 123/41.02, 41.08, 41.09, 123/41.1; 237/12.3 B, 8 A; 251/129.05, 129.11, 358

[56] References Cited

U.S. PATENT DOCUMENTS

| | | | |
|---|---|---|---|
| 2,059,687 | 11/1936 | Gagg | 251/358 |
| 4,058,255 | 11/1977 | Linder et al. | 237/12.3 B |
| 4,176,823 | 12/1979 | Gliatas | 251/358 X |
| 4,181,288 | 1/1980 | Bylsma | 251/129.11 |
| 4,475,485 | 10/1984 | Sakakibara et al. | 123/41.1 |

FOREIGN PATENT DOCUMENTS

| | | | |
|---|---|---|---|
| 2700928 | 7/1977 | Fed. Rep. of Germany | 251/129.11 |
| 1363922 | 8/1974 | United Kingdom | 251/129.11 |

Primary Examiner—Noah P. Kamen
Attorney, Agent, or Firm—R. A. Johnston

[57] ABSTRACT

A motorized water valve of the butterfly-type having the motor case and gear reduction housing formed integrally with the valving chamber. The metal butterfly has elastomeric material formed thereover to provide improved sealing and prevent leakage when the valve is closed thereby enabling substantially shortened warm-up in thermostat application. The control system employs the valve at the engine block outlet to control coolant flow to the radiator in response to an electrical control signal based upon comparison of the sensed block temperature with a desired engine temperature. The control system also employs the valve to control coolant flow to the heater core in response to an electrical control signal based upon a comparison of sensed in-car temperature and a desired in-car temperature selectd by the driver. Heater core discharge air may also be sensed and included in the comparison to provide a control signal to permit automatic in-car temperature regulation. An additional control signal also be generated from the comparison to control heater blower speed control. The control system, upon cold engine starts, opens the radiator coolant valve fully for a short time to allow full flow to clean the valve and remove deposits, then returns to the closed position to continue engine warm-up. The control system may also employ an outside air temperature transducer to provide a signal used in the comparison to enable automatic regulation of desired engine coolant temperature.

20 Claims, 3 Drawing Sheets

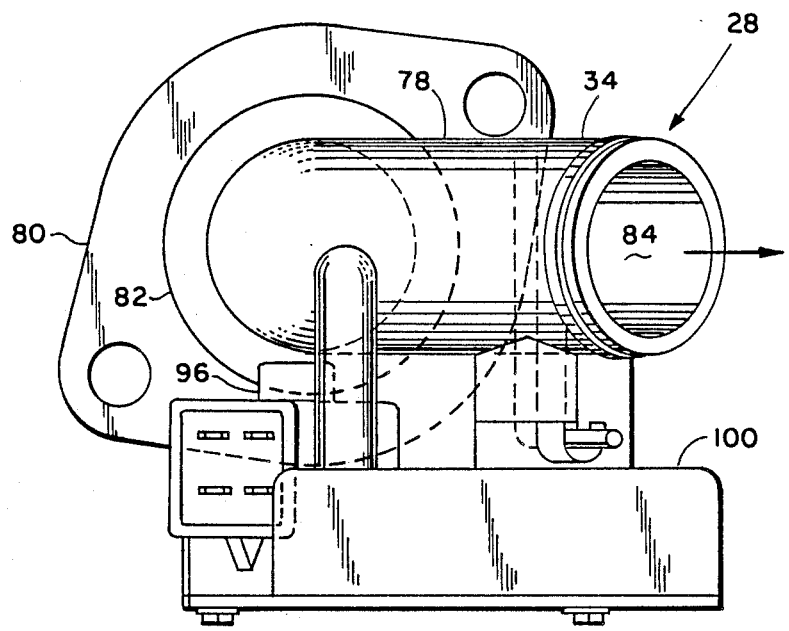
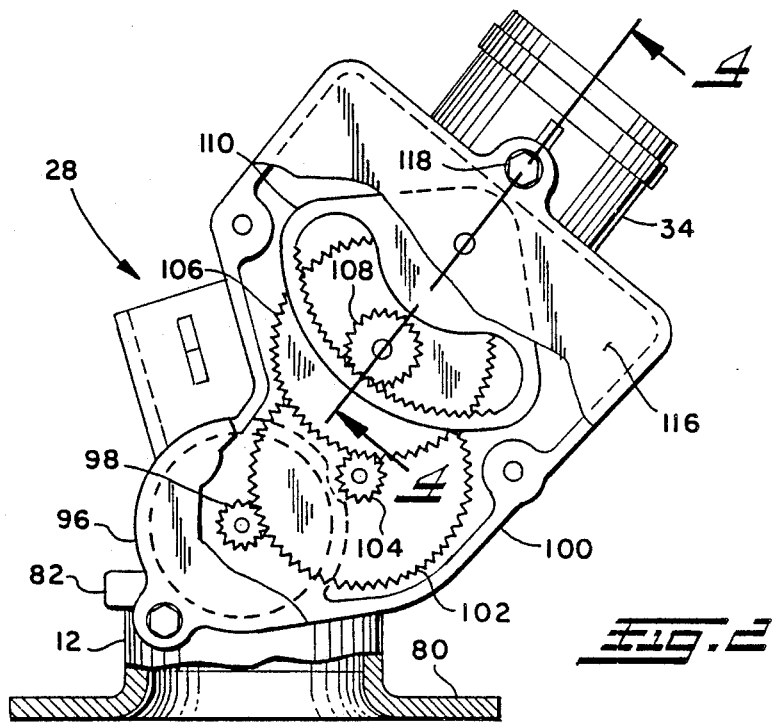

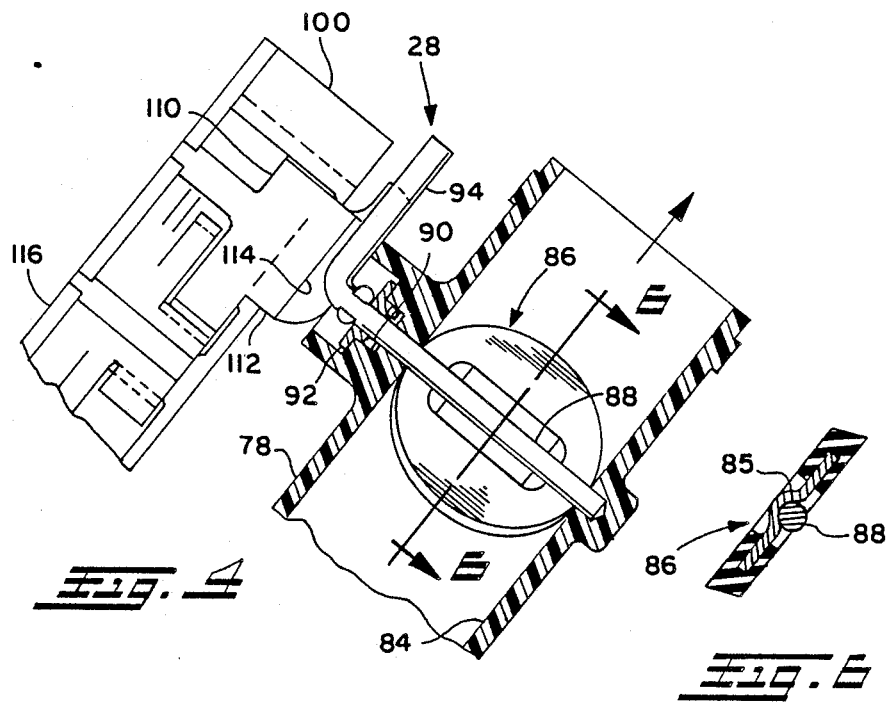
Fig. 4
Fig. 6
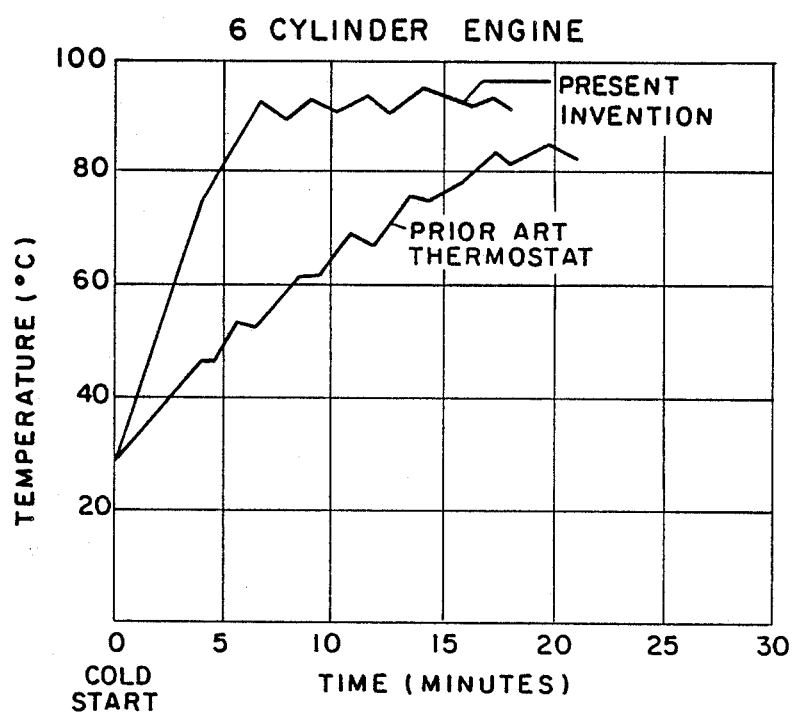
Fig. 5

CONTROLLING ENGINE COOLANT FLOW AND VALVE ASSEMBLY THEREFOR

This application is a continuation of application Ser. No. 882,665, filed July 7, 1986, now abandoned.

BACKGROUND OF THE INVENTION

In vehicles powered by internal combustion engines of the liquid cooled type, it is common practice to circulate engine coolant through an air cooled heat exchanger, or radiator, for cooling the engine. It is also common practice to circulate engine coolant through an air heat exchanger or heater core for providing heated air to the vehicle passenger compartment for cold climate operation of the vehicle.

For many years it has been the practice in automotive vehicle design, to control the flow of coolant to the radiator by retarding or blocking flow by a thermally operated valve, or thermostat, upon cold engine start-up to enable the engine to reach normal operating temperature before the liquid coolant is circulated to the radiator. Such thermostats have heretofore been operated by differentially expansible bi-metal actuators, or more recently, expansible wax pellet charge type actuators for opening the coolant valve upon the coolant in the engine reaching the desired operating temperature. When thermostatic valves of either of the aforementioned types are opened to permit coolant circulation through the radiator, the recirculation of cooled liquid in the engine causes the thermoactuator to severely restrict the flow of coolant through the valve. In particular, it has been found that wax pellet type thermostats operate in cool or cold weather with the thermostatic valve only very slightly open, or almost closed, thereby providing only a fraction of the flow of which the valve is capable of in the fully open position.

When a typical automotive engine coolant thermostat is operated at only a slightly open position, sludge formed by rust and particles of foundry core sand from the engine block casting, have been found to accumulate on the valve and create deposits which thus prevent the thermostat from completely closing. When deposits on the thermostatic valve prevent complete closing thereof, upon cold engine start-up, flow is permitted through the thermostatic valve immediately and warm-up of the engine is thus retarded.

In modern passenger automobile engine design, it has been found that the engine warm-up period must be kept as short as possible in order to reduce the inefficiency of the combustion and the resultant undesirable exhaust emissions resulting from inefficient combustion. Thus, it has been desired to provide control of the liquid coolant in an engine in such a way as to maximize the engine warm-up process.

However, for a given full load cooling capacity of an engine/radiator cooling system, it is necessary to severely restrict or throttle the flow of coolant with the thermostatic valve in order to prevent the engine coolant operating temperature from dropping below the desired level at less than full power or full load operating conditions. In particular, where the radiator has the cooling capacity for accommodating full power vehicle operation in extreme environments such as hot and humid or desert climates at less than full power and in moderate climatic conditions, the thermostat will be required to severely restrict flow to the radiator. This restriction of coolant flow by the thermostatic valve has proven to be troublesome in service because of deposit build-up in the restricted flow position of the valve.

Thus, it has long been desired to find a way or means of controlling engine coolant flow to the radiator in a manner which would maintain constant operating temperature in the face of a widely varying engine power and climatic conditions, and to eliminate the problems encountered with severe throttling through the thermostatically controlled valve.

In another aspect of engine coolant circulation, where the coolant is employed in a heater core for maintaining passenger compartment comfort in cold climate operation, it has been typical automotive design practice to employ a manual control for vehicle occupant selection of the position of a flow control valve, typically of the butterfly-type, for altering the flow of engine coolant through the heater core. In addition, provisions are usually made for the vehicle occupant to select from plural settings of a blower speed control for increasing or decreasing the forced air circulation from the blower over the heater core. Where automatic control of passenger compartment temperature has been desired, typical automotive design practice has been to employ a vacuum motor to vary the position of a blend door for mixing refrigerated air with heated air for controlling the temperature of the air discharged from the blower plenum to the passenger compartment. Such control systems have also employed a blower speed control switch slaved to the vacuum motor for proportioning heater blower speed with the control movements of the air blend door in the plenum.

However, it has long been desired to eliminate mixing heated and refrigerated air to control passenger compartment temperature because this technique requires operation of the air conditioning refrigeration compressor to provide a source of cooled air for tempering the discharge air to the passenger compartment. Thus, it has long been desired to find a way or means of automatically electrically controlling the flow of engine coolant to the heater core in order to enable automatic modulation of the heater core temperature instead of providing refrigerated air from the air conditioning evaporator mixed with the air blown over the heater core in order to provide tempered air to the passenger compartment.

SUMMARY OF THE INVENTION

The present invention provides a unique method of controlling circulation of engine coolant to a heat exchanger to maintain the engine at a constant operating temperature in the face of extremes of power loading and climatic conditions of vehicle operation. The present invention provides an electrically actuated butterfly-type coolant flow valve which has an elastomeric seating surface for completely sealing the flow of coolant in the closed position. The present invention employs a motorized actuator mounted directly on the valve for varying the position of the butterfly in response to an electrical control signal. The control signal is generated by comparison of a temperature selected from the group consisting of a engine coolant temperature, heater core discharge air temperature and vehicle passenger compartment ambient temperature, and comparing the sensed temperature with a desired or selected temperature, and the electrical control signal variation is representative of the comparison. The control signal energizes the motorized actuator for controlling the position of the butterfly valve to modulate the coolant flow for regulating the sensed temperature about the reference temperature.

In one unique aspect of the invention, the electrically energizable butterfly valve is suddenly opened to effect full coolant flow for only a fraction of the cold engine warm-up interval, in order to provided full flow flushing of the valve to remove accumulated deposits from the valve seating surfaces and then re-closed to continue engine warm-up. This sudden opening and closing provides a unique automatic means of self-cleaning the coolant flow control valve to prevent deposit build-up on the valve seating surfaces which can prevent full closing of the valve and cause an increase in cold start engine warm-up interval.

The present invention thus provides a unique and novel control of engine coolant circulation to an external heat exchanger. The invention provides electrically controlled modulation of the coolant flow to regulate engine temperature where the valve is employed to control flow to the radiator, and enables electrically controlled modulation of the coolant flow to a heater core where the valve assembly is employed for passenger compartment temperature control.

BRIEF DESCRIPTION OF THE DRAWINGS

FIG. 2 is a front elevation view of the valve assembly of the present invention;

FIG. 3 is a top view of the valve assembly of FIG. 2; and,

FIG. 4 is a partial section view taken along section-indicating lines 4—4 of FIG. 2.

FIG. 5 is a graph of engine temperature plotted as a function of time from cold engine start.

FIG. 6 is a section view taken along section-indicating lines 6—6 of FIG. 4.

DETAILED DESCRIPTION

Figure 1:
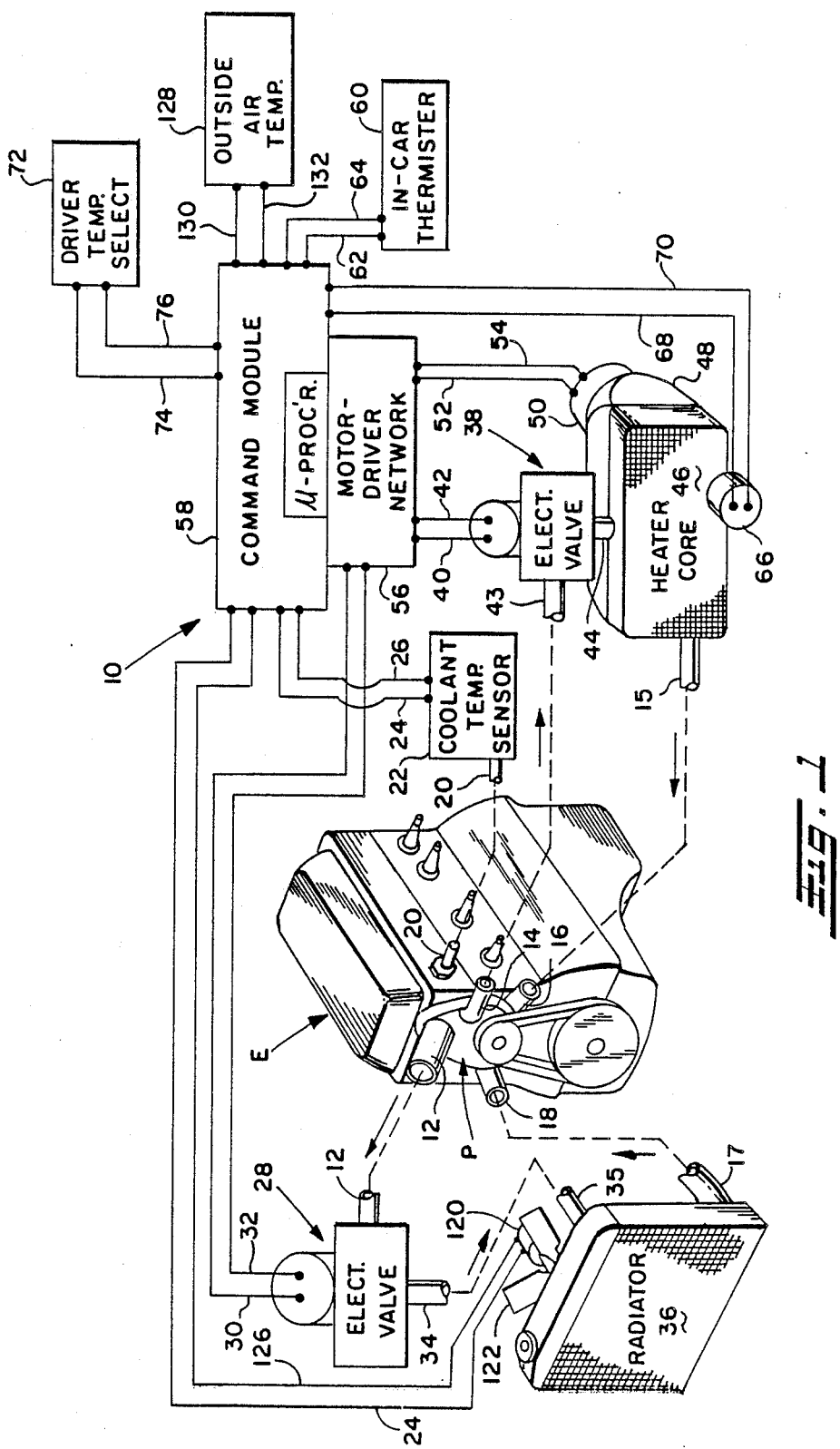
FIG. 1 is a pictorial schematic of the control system of the present invention.

Referring to FIG. 1, the control system of the present invention, is indicated generally at 10, as employed in an engine, indicated generally by the reference character E, having a coolant water outlet 12, typically from the front of the cylinder head in an in-line engine, and from the top of the intake manifold in VEE-type engines for coolant flow through a heat exchanger circuit and a return from the heat exchanger to the suction side of the engine water pump P at inlet 18. The engine E typically has a second coolant outlet 14 from the water pump P for connection to a heater core circuit and a corresponding return line 16 to the suction side of the water pump indicated generally by the reference character P, which also has a main return 18 to the suction side of the pump.

An engine coolant tap 20 is provided in the cylinder head for connection to a sensor 22 which, in the present practice of the invention, is a temperature transducer providing an electrical signal output through leads 24, 26, which is indicative of changes in the sensed temperature of the coolant and the cylinder head.

The engine water outlet 12 is connected to an electrically actuated coolant valve indicated generally at 28. The valve assembly 28 includes a motorized actuator energized through electrical leads 30, 32 by a suitable control signal as will hereinafter be described. The outlet of the valve 28 is connected along conduit 34 to the inlet 35 of the engine heat exchanger or radiator 36 with the outlet 17 thereof, connected to the water pump suction line 18 for return flow in the cooling circuit.

The water pump outlet 14 is connected to the inlet 43 of a similar electrically actuated valve, indicated generally at 38, which is energized along electrical lines 40-42 and which has the outlet 44 thereof connected to the inlet of a passenger compartment heater core 46 which has the outlet 15 thereof connected to water pump return line 16.

The heater core has a forced air plenum 48 with blower 50 connected thereto for directing a flow of air across the heater core 46 to the vehicle passenger compartment upon electrical energization of the blower leads along 52-54.

The valves 28, 38 and blower 50 are energized by a motor driver network 56 which is connected to a command module 58 which includes a suitable microprocessor for generating the control logic for the motor driver network. The command module receives inputs from the coolant sensor 22 and an in-car thermistor 60 connected to the command module by electrical leads 62, 64. An optional heater discharge air transducer 66 may also be employed to provide inputs to the command module along electrical leads 68, 70, alternatively, transducer 66 may be mounted in heater core outlet 15 to sense the temperature of the coolant flow as it leaves the heater core 46, as shown by the dashed outline in FIG. 1. The command module also receives inputs from a driver temperature select control 72 connected to the command module by electrical leads 74, 76.

Referring to FIGS. 2, 3 and 4, the valve assembly 28 has a housing 78, preferably formed of suitable temperature resistant plastic material. The valve inlet 12 preferably comprises a metal flange 80 adapted for direct connection to the engine water outlet, which flange is connected to the plastic housing 78 by a suitable clamping band 82.

The valve outlet 34 is adapted for connection to a suitable flexible hose for connection to the radiator inlet 35.

Referring to FIG. 4, the valving passage 84 has disposed therein a butterfly-type valving member 86 which is rigidly attached to a shaft 88, which is journalled at one end thereof in the wall of the housing 78, and has the opposite end thereof extending through the wall of the housing and journalled therein and sealed thereabout by a suitable O-ring 90 received in a boss 92 provided on the housing. The end of shaft 88 extending through boss 92 extends outwardly therefrom and is bent at right angles thereto and extends toward the outward end of the housing in generally parallel relationship thereto as denoted by the reference character 94 in FIG. 4. The end 94 of the valve shaft is secured to the butterfly 86 in such a manner that when the valve is in the fully open position, the portion 94 is generally parallel to the direction of fluid flow in passage 84.

Referring to FIGS. 2, 3 and 4, a suitable motor such as a stepper motor denoted 96 is mounted on the housing 78, and has a drive pinion 98 connected to the shaft thereof, which pinion extends into a gear housing 100 attached to the valve housing 78. The motor pinion 98 engages a cluster gear 102 which has attached thereto at the hub thereof, for rotation therewith, a second pinion 104 which engages a second cluster gear 106, which has attached at its hub an output pinion 108. The output pinion 108 engages a toothed segment of a sector gear 110 which rotates the output shaft of the gear box.

Referring to FIG. 4, the gear box output shaft is shown as a hub 112 of sector gear 110, which hub extends outwardly through the wall of gear housing 100 and preferably has formed in the end thereof a suitable groove or slot 114. The gear box 100 has a suitable plastic cover plate 116 which is attached to the box 100 by suitable fasteners such as, for example, self-tapping screws 118. If desired, the ends of the shafts or axles for the various gears may be journalled in bosses or apertures provided in the cover plate 116.

Referring to FIG. 4, the groove or slot 114 in the output gear hub 112 has the end 94 of the valve shaft received therein in torque-transmitting engagement, such that rotation of the output gear 110 causes a corresponding rotation of the shaft 88. The end 94 of shaft 88 extends outwardly beyond the end of the gear box 100 and serves as a visual indicator of the valve position.

In the presently preferred practice, the gear box has a speed reduction ratio of 1:158 between the motor pinion and the sector gear hub 112; however, it will be understood that other ratios may be employed for the gear box to provide the desired amount of control resolution for the valve 28. In the present practice, the stepper motor rotates at the rate of 80 steps per, second in intervals of 15° central arc per step giving approximately 1/10° rotation per motor step, at the valve shaft 88. Also, if desired, the housing for the motor 96 may be molded integrally with the valve housing 78.

Referring to FIGS. 4 and 6, the butterfly 86 is preferably formed of a steel plate 85 and is coated with elastomer 87 molded thereover prior to attachment to the shaft 88 to provide a resilient peripheral seating surface.

The butterfly 86 is preferably mounted on shaft 88 in a balanced configuration so as to provide equal force moments about shaft 88 of the dynamic fluid forces of the coolant flow acting on the surface of the butterfly 86.

It will be understood that the butterfly-type valve 28 provides full flow with less than full opening of the butterfly 86 as is well known in the art. The valve 28 of the present invention has been found to provide substantially full flow by rotation of the butterfly in an amount of 45° from the fully closed position. In the presently preferred practice, the motor and gear box provide movement of the butterfly 86 from the fully closed to full flow condition in approximately seven seconds. The valve assembly 28 of the present invention may thus be readily moved to any desired position by appropriate electrical signal to the stepper motor and is thus sufficiently responsive to enable the engine coolant flow to be controlled in a desired manner. This is in contrast to prior thermally responsive engine thermostats which required a 25° temperature rise in the coolant to provide full opening of the poppet valve controlling coolant flow. The control system of the present invention senses coolant temperature in the engine and compares the sensed temperature with a driver selected or a desired predetermined engine coolant temperature and generates a control signal responsive to the difference to cause the stepper motor to move the butterfly valve to increase or decrease coolant flow to bring the sensed temperature to the same level as the desired temperature.

In the presently preferred practice of the invention, valve 28 is controlled in accordance with the following algorithm.

$$Steps = 1/16 \, [1.0(DT-CT) + 8.0(PT-CT)]$$

Where
  DT equals desired temperature
  CT equals current temperature
  PT equals previous temperature.

In the presently preferred practice a sampling period of three seconds has been found to be satisfactory for the sensing of PT.

In the presently preferred practice, when the quantity (PT−CT) is equal to or less than one, the gain factor of 8.0 is employed in the above algorithm. However, when the quantity (PT−CT) is greater than one, but equal to or less than two, a gain factor of 16 is employed. When the quantity (PT−CT) has a value greater than two, it has been found satisfactory to use a gain of 32 in the above algorithm.

In another aspect of the invention, the command module is programmed to provide an initial sudden full open flushing or "clean sweep" cycle of the valve immediately upon cold engine start-up to effect full opening of the valve for a small fraction of the engine warm-up interval. This sudden opening permits maximum coolant flow therethrough to remove any foreign particles or build-up of deposits on the valve seating surface and thereby prevent leakage when the valve is in the fully closed position. In the presently preferred practice, the sudden opening of the valve to the fully open position is permitted for generally an interval of less than 30 seconds after which the valve is returned to the closed position.

The elimination of leakage in the closed position enables the present invention to provide faster warm-up of the engine as compared to the warm-up interval of a conventional temperature responsive thermostat. With reference to FIG. 5, engine temperature is plotted as the ordinate and elapsed time from initial cold engine start is plotted as the abscissa as found for the present electrically actuated valve and for prior art thermostat when employed in an engine having a displacement of less than three (3) liters. From the plot of FIG. 5, it will be seen that the present invention provides full engine warm-up in about 40% of the time required for that of a prior art thermostat.

Referring now to FIG. 1, the valve 38 employed to control flow to the heater core 46 is similar to valve 28 except the housing 78 is arranged to have a straight valving passage and the metal mounting flange is omitted for in-line installation in the flexible hose from water pump outlet 14 to the inlet 43 of the valving 38. Valve 38 is otherwise structurally and functionally similar to valve 28 and a separate illustration of valve 38 is omitted for the sake of brevity.

The valve 38 is controlled by a control signal generated by comparing the output of the in-car thermistor 60 with a selected temperature input from driver select 72 to move the position of the butterfly in valve 38 to increase or decrease coolant flow to the heater core 46 to regulate passenger compartment temperature about a level represented by the control selection of the driver.

In fully automatic temperature control systems, the optional transducer 66 senses the temperature of air blown over the heater core 46 by the flow of air forced through plenum 48 by blower 50 as it is discharged into the vehicle passenger compartment, or coolant discharging from heater core 46. Temperature of the heated air discharged to the passenger compartment, or coolant discharging from heater core 46, along with the temperature signal from the in-car thermistor 60 is compared with the temperature from a fixed temperature signal provided by the driver temperature select control 72. This provides a control signal to valve 38 calling for increased or decreased coolant flow to the heater core to modulate the passenger compartment temperature.

For the simplest system the command module 58 provides a signal to the motor driver 56 such that the motor for valve 38 is stepped in accordance with the algorithm.

$$steps = 1/16[K_D(D_T - C_T) + K_P(P_T - C_T)]$$

Where $K_D$ is typically equal to one (1) and $K_P$ typically has a value of twenty (20), and where $D_T$ is the desired temperature or temperature set by driver select 72, $C_T$ is the current or latest sampling of in-car thermistor 60, $P_T$ is the previous sampling of thermistor 60 with a sampling period of preferably five (5) seconds, with a step speed of preferably eighty (80) Hertz and a gate size of plus or minus two-tenths of one degree Centigrade ($\pm 0.2°$ C.).

For a more sensitive control system, the optional transducer 66 is employed to heater core discharge air temperature, as shown in solid outline in FIG. 1, and the motor for valve 38 is stepped in accordance with the algorithm:

$$\text{Steps} = 1/16 \left[ \frac{K_D(D_T - C_T) + K_P(P_T - C_T)}{H_{AT}} \right]$$

where $K_D$, $K_P$, $D_T$, $C_T$ & $P_T H_{AT}$ are as described above and where $H_{AT}$ is the output of optional sensor 66 sensing heater core air discharge. In another more sensitive version of the invention control system, the optional sensor 66 is employed in the position shown in dashed outline in FIG. 1 to sense heater core coolant temperature returning to the water pump. In this latter version of the control system, the control signal to the motor for valve 38 is in accordance with the following algorithm:

$$\text{Steps} = \frac{1}{16} \left[ \frac{K_D(D_T - C_T) + K_P(P_T - C_T)}{H_{IT} - H_{OT}} \right]$$

where $K_D$, $K_P$, $D_T$, $C_T$ and $P_T$ are as described above, $H_{IT}$ is the temperature of the coolant entering the heater core as measured by the signal from transducer 22; and, $H_{OT}$ is the heater core coolant outlet temperature as sensed by transducer 66.

In all three of the above algorithms, the value of $K_P$ changes with the value of the quantity $(P_T - C_T)$; and, preferably a modified valve of $K_P$ denoted by $K_P$ is employed in the algorithms according to the following:

if $(P_T - C_T)$ is equal to less than one: $K_P = K_P$;

if $(P_T - C_T)$ is greater than one and equal to or less than two (2): $K_P = 2K_P$;

if $(P_T - C_T)$ is greater than two (2): $K_P = 4K_P$.

If desired, the command module may also be programmed to similarly increase or decrease the speed of the blower 50 in addition to increasing or decreasing coolant flow to the heater core to provide faster response of the system to changes in ambient passenger compartment conditions.

In another aspect of the invention, an electric motor 120 is employed for driving a radiator fan 122 and the motor 120 is connected via leads 124, 126 to the command module. Motor 120 is energized by module 58 for forcing air flow over the radiator when the coolant sensor 22 indicates that the maximum allowable engine temperature has been reached.

The present invention thus provides a novel electrically controlled butterfly valve for controlling engine coolant flow to a heat exchanger. In one aspect, the valve is employed as an engine water outlet valve 28. In another aspect, the valve is as the heater core inlet valve 38. In the embodiment 28, the housing of the valve is arranged for direct attachment to the engine water outlet; and, in the embodiment 38 the valve housing is of the straight through type for in-line connection. The electrically operated butterfly valve of the present invention, either form 28 or 38, provides a unique assembly of, motor-actuator and valve and which provides for external visual indication of the position of the butterfly valve in the event of malfunction to facilitate diagnosis of the failure cause.

The control system of the present invention not only provides for automatic variation in coolant flow through the radiator to regulate the engine temperature about a desired value, but enables the coolant flow to be controlled independently of the engine temperature. The invention control system enables an initial sudden opening and closing of the valve during engine warm-up to provide for flushing and removal of deposits to prevent leakage when the valve is closed. The unique construction of the valve prevents leakage in the closed position to enable faster cold-start engine warm-up and the consequent reduction in undesired exhaust emissions.

Where the valve is employed to control temperature regulation of the passenger compartment by controlling coolant flow to the heater core independently of the speed of the heater blower. However, if desired, the blower speed may be automatically controlled to increase the response of the system to changes in the passenger compartment temperature.

In the automatic mode for control of passenger compartment temperature, the control system generates a control signal for the valve 38 based upon signal inputs indicative of heater core blower discharge air temperature, in-car thermistor sensed temperature and a signal from the driver temperature select control.

In another variant, the driver temperature select control may also include a function for selecting normal or increased engine temperature operation. This mode provides the vehicle operator with a means of raising the coolant temperature in the engine for purposes of increasing heater core temperature for providing faster warming of the passenger compartment. Increasing the temperature of the heater core also increases the temperature of discharge air diverted for the defrost function.

Although the invention has hereinabove been described with respect to the illustrated embodiments, it will be understood that the invention is capable of modification and variation and is limited only by the following claims.

We claim:

1. A method of controlling coolant for through the heat exchanger circuit of an internal combustion engine comprising the steps of:

(a) channeling coolant flow from the engine through a valving passage to the coolant heat exchanger;
   (b) providing a valve in said passage;
   (c) sensing the coolant temperature in said engine;

(d) opening said valve upon cold engine start-up to permit substantially full flow therethrough for a brief interval comprising a small fraction of the engine warm-up period, for cleaning foreign particles from the valve seating surfaces, and returning said valve to a partially open position for continued warm-up; and, (e) modulating the position of said valve responsive to changes in said sensed temperature for controlling coolant flow to maintain normal engine operating temperature.

2. The method defined in claim 1, wherein the step of opening said valve for full flow upon cold engine start-up comprises substantially immediately opening said valve for full flow upon cold engine start-up.

3. The method defined in claim 1, wherein the step of sensing temperature includes the steps of generating an electrical signal indicative of changes in sensed temperature and providing a motor driver electrical signal therefrom; and, said step of modulating includes the step of driving an electric motor responsive to said motor driver signal and moving said valve member with said motor.

4. The method defined in claim 1, wherein the step of providing a valve in said passage includes the step of pivoting an elastomer covered plate in said passage and balancing the fluid forces acting on said plate about the axis of said pivoting.

5. A system for controlling flow of coolant in a circuit comprising an internal combustion engine and a heat engine coolant to passenger compartment air in a vehicle, said system comprising:

(a) heat exchanger means having an inlet and an outlet which is connected to the engine for coolant flow therethrough;

(b) transducer means operative to sense temperature in the vehicle passenger compartment, said transducer means operative in response to said sensed temperature to provide an electrical temperature feedback signal;

(c) electrically actuatable valve means with the inlet thereof receiving heated coolant from the engine with the outlet of said valve means, said valve means having a housing means formed of plastic material and defining integrally therewith a flow passage, a motor cavity and a gear box with a stepper motor disposed in said cavity and speed reducer means having an output disposed in said gear box and driven by said stepper motor, said valve means including a rigid pivoted member movable by said speed reducer output between a closed position preventing flow thereover and an open position permitting coolant flow to said heat exchanger, said pivoted member having an elastomeric seating surface for preventing coolant leakage in the closed position;

(d) logic and power circuit means operable in response to said temperature feedback signal and a comparison thereof with a reference temperature to provide a valve actuation signal for actuating said stepper motor to position said valve member in a preselected position in response to said comparison and thereby control coolant flow for modulating said passenger compartment temperature at said reference temperature.

6. The control system defined in claim 5, wherein said heat exchanger comprises a passenger compartment heater core and said transducer means comprises an in-car air temperature sensor.

7. The control system defined in claim 5, wherein said valve means includes a reversible motor and speed reducing means for moving said pivoted member.

8. The control system defined in claim 5, wherein
(a) said heat exchanger means comprises a passenger compartment heater core;
(b) said transducer means comprises a passenger compartment air temperature sensor; and,
(c) further comprising temperature select means operable upon actuation by a vehicle occupant to provide an electrical signal to said circuit means for providing said reference temperature.

9. The control system defined in claim 5, further comprising blower means for directing a flow of air across said heater core and plenum means for directing said air flow to the vehicle passenger compartment and wherein said transducer means includes a first thermistor disposed to sense the air temperature in said plenum means and a second thermistor disposed to sense in-car air temperature for providing said feedback signal.

10. A system for controlling flow of coolant in a circuit comprising an internal combustion engine and a heat exchanger for transferring heat from the engine coolant to ambient air said system comprising:

(a) heat exchanger means having an inlet and an outlet which is connected to the engine for coolant flow therethrough;

(b) transducer means operative to sense engine coolant jacket temperature, said transducer means operative in response to said sensed temperature to provide an electrical temperature feedback signal;

(c) electrically actuatable valve means with the inlet thereof receiving heated coolant from the engine with the outlet of said valve means discharging to the inlet of said heat exchanger means, said valve means having a housing means formed of plastic material and defining integrally therewith a flow passage, a motor cavity and a gear box with a stepper motor disposed in said cavity and speed reducer means having an output disposed in said gear box and driven by said stepper motor, said valve means including a rigid pivoted member movable by said speed reducer output between a closed position preventing flow thereover and an open position permitting coolant flow to said heat exchanger, said pivoted member having an elastomeric seating surface for preventing coolant leakage in the closed position;

(d) logic and power circuit means operable in response to said temperature feedback signal and a comparison thereof with a reference temperature to provide a valve actuation signal for actuating said stepper motor to position said valve member in a preselected position in response to said comparison and thereby control coolant flow for modulating said engine temperature at said reference temperature.

11. A system for controlling flow of coolant in a circuit comprising an internal combustion engine and a heat exchanger for transferring heat from the engine coolant to passenger compartment air in a vehicle, said system comprising:

(a) heat exchanger means having an inlet and an outlet which is connected to the engine for coolant flow therethrough;

(b) means for flowing air over said heat exchanger means and discharging same into the passenger compartment;

(c) transducer means operative to sense temperature of said discharging air closely adjacent said heat exchanger means, said transducer means operative in response to said sensed temperature to provide an electrical temperature feedback signal;

electrically actuatable valve means with the inlet thereof receiving heated coolant from the engine with the outlet of said valve means discharging to the inlet of said heat exchanger means, said valve means having a housing means formed of plastic material and defining integrally therewith a flow passage, a motor cavity and a gear box with a stepper motor disposed in said cavity and speed reducer means having an output disposed in said gear box and driven by said stepper motor, said valve means including a rigid pivoted member movable by said speed reducer output between a closed position preventing flow thereover and an open position permitting coolant flow to said heat exchanger, said pivoted member having an elastomeric seating surface for preventing coolant leakage in the closed position;

logic and power circuit means operable in response to said temperature feedback signal and a comparison thereof with a referenced temperature to provide a valve actuation signal for actuating said stepper motor to position said valve member in a preselected position in response to said comparison and thereby control coolant flow for modulating said discharging air at said reference temperature.

12. A method of controlling coolant flow between an internal combustion engine and an air heat exchanger comprising the steps of:
(a) providing an electrically operated valve in fluid series flow arrangement in the circuit of coolant flow between said engine and said heat exchanger;
(b) sensing the temperature of the coolant in said engine and providing an electrical signal representative of said sensed temperature; and,
(c) comparing said sensed temperature signal with a reference temperature signal and generating a valve control signal and controlling the position of said valve to alter coolant flow for modulating engine temperature about said reference temperature; and,
(d) opening said valve sufficiently to effect full flow for a small fraction of the cold engine warm-up interval and flushing said valve of foreign material.

13. An electrically actuated valve assembly for controlling flow of engine coolant, said valve assembly comprising:
(a) housing means formed of plastic material and integrally defining a coolant flow passage having an inlet and outlet, a motor casing and a gear box;

(b) a butterfly valving member disposed in said passage between said inlet and outlet, said valving member pivoted about an axis transverse to the direction of flow and operable for pivoted movement between a closed position of open positions permitting partial or full flow therethrough;

(c) a shaft extending through the wall of said housing into said passage and journalled therein for rotation with respect thereto, said shaft having the end portion thereof external to said passage including indicator means extending in a direction generally parallel to said butterfly member, said shaft having said valving member attached thereto for providing said pivoted movement upon rotation of said shaft;

(d) stepper motor means including speed reducer means received in said casing, said speed reducer means received in said gear box having power output shaft means with torque coupling means provided thereon, said torque coupling means engaging said external end portion of said shaft for effecting rotation thereof upon said stepper motor being energized by an electrical control signal.

14. The valve assembly defined in claim 13, wherein said valving member has said shaft member attached to the geometric center of pressure thereof to provide balanced pressure force moments about said pivot axis.

15. The valve assembly defined in claim 13, wherein said output shaft means comprises a gear hub and said torque coupling means comprises a slot formed in the end of said gear hub.

16. The valve assembly defined in claim 13, wherein said housing means is formed of plastic material and said inlet comprises a metal flange adapted for connection directly to an engine coolant output port, said metal flange connected to said plastic housing with means for sealing therearound.

17. The valve assembly defined in claim 13, wherein said housing means is formed of plastic material and further comprising a metal flange adapted for direct connection to an engine coolant outlet and secured to said housing inlet by a clamping band.

18. The valve assembly defined in claim 13, wherein said inlet includes a flanged metal member adapted for connection directly to the coolant outlet port on an engine.

19. The valve assembly defined in claim 13, wherein said housing is formed of plastic material and has a metal flange provided at the inlet, which is adapted for direct connection to the coolant outlet port of an engine.

20. The valve assembly defined in claim 19, wherein said exterior end portion of said shaft extends outwardly of said coupling means and in a direction parallel to said butterfly providing a visible indication of the position of said valving member in said passage.

* * * * *